United States Patent [19]

Matsukawa et al.

[11] 3,996,156
[45] Dec. 7, 1976

[54] PRODUCTION OF MICROCAPSULES

[75] Inventors: Hiroharu Matsukawa; Keiso Saeki; Akio Watanabe, all of Fujinomiya, Japan

[73] Assignee: Fuji Photo Film Co., Ltd., Minami-ashigara, Japan

[22] Filed: May 28, 1974

[21] Appl. No.: 473,981

[30] Foreign Application Priority Data

May 28, 1973 Japan .............................. 48-59591

[52] U.S. Cl. .............................. 252/316; 252/62.56; 252/182; 252/364; 252/522; 427/151; 427/384; 428/307

[51] Int. Cl.$^2$ .......................................... B01J 13/02

[58] Field of Search .................. 252/316; 117/62.2; 427/384

[56] References Cited

UNITED STATES PATENTS

| | | | |
|---|---|---|---|
| 2,996,517 | 8/1961 | Leech et al. | 260/340.7 |
| 3,432,327 | 3/1969 | Kan et al. | 252/316 X |
| 3,577,515 | 5/1971 | Vandegaer | 252/316 X |

Primary Examiner—Richard D. Lovering
Attorney, Agent, or Firm—Sughrue, Rothwell, Mion, Zinn and Macpeak

[57] ABSTRACT

A process for the production of microcapsules comprising bonding chemically or physically a heterocyclic diamine, which is soluble or dispersible in water, to an organic compound in a polar solvent to thereby form a substance, which is insoluble in the polar solvent, and then depositing the substance directly on the surface of particles or droplets of a hydrophobic core material.

14 Claims, No Drawings

PRODUCTION OF MICROCAPSULES

BACKGROUND OF THE INVENTION

1. Field of the Invention

The present invention relates to a process for producing microcapsules by encapsulating hydrophobic materials (liquids or solid powders) in a polar solvent. More particularly, the present invention relates to a process for producing microcapsules using polyfunctional amines in combination with reactive organic compounds which are capable of reacting with the polyfunctional amines to form substances insoluble in the polar solvent.

2. Description of the Prior Art

Various processes for encapsulation of a hydrophobic material in a polar solvent are known.

The apparent state and properties of a material can be changed by encapsulation. That is, the material can be protected in the microencapsulated state and the ability of the material (the capsule contents) to be released can be controlled. Moreover, the capsule contents can be released all at once when desired.

The functions of the microcapsule are as follows:
1. A liquid can be seemingly changed to a solid.
2. The weight and volume of a material can be changed.
3. The release of the contents can be controlled.
4. Two or more reactive materials can be isolated and stored together for a long period. The contents can be protected from the atmosphere or stored for a desired period.
5. The contents can be prevented from coloring, the taste of the contents can be masked and toxic materials can be protected.
6. Microcapsules are fine particles.

In view of these functions, applications of microcapsules to recording materials, medicines, perfumes, agricultural medicines, chemicals, adhesives, liquid crystal paints, foods, detergents, dyes, solvents, catalysts, enzymes, anti-corrosive agents and the like have been investigated. Thus, nowadays, pressure sensitive copying papers, aspirin capsules, perfume capsules, menthol capsules, adhesive capsules, capsules containing an anti-corrosive agent for rivets, liquid crystal capsules, insecticicde capsules and the like have been commercially produced, and various encapsulation methods are skillfully utilized depending upon the capsule contents and the use of the capsules.

A number of encapsulation methods can be classified into chemical, physical-chemical, and mechanical-physical methods, or a combination of these methods.

These encapsulation methods are explained in greater detail hereinbelow.

Encapsulation methods employing a chemical method include an interfacial polymerization method and an in situ polymerization method. The interfacial polymerization method utilizes a polymerization reaction per se, and is described in *Polymer Science*, 60, 299 (1959). In this case, an interfacial polymerization is carried out combining hydrophobic monomers (initial reaction products are also used) and hydrophilic monomers (initial reaction products are also used). A hydrophobic monomer is incorporated into an organic solvent which does not have any affinity for water, which is dispersed in a water phase. When a water-soluble or water-dispersible monomer is added to the water phase, polymerization proceeds at the water and oil interface, thus resulting in the formation of a polymer film. Compounds suitable in forming the film are polyfunctional materials capable of undergoing polycondensation or polyaddition reactions, and thus a polyamide, polyester, polyurethane, or polyurea wall is formed.

Encapsulation methods employing the above principle are described in Japanese Pat. Publication Nos. 19574/1963, 446/1967, 771/1967, 2882/1967, 2883/1967, 8693/1967, 8923/1967, 9654/1967, and 11344/1967; British Pat. Nos. 950,443, 1,046,409, and 1,091,141; and U.S. Pat. Nos. 3,577,515 and 3,492,380.

The capsule wall as prepared by the above-described method is a typical semipermeable membrane because the speed at which the monomer reacts is reduced with formation of the capsule wall and finally stops, thereby resulting in the formation of a thin film and the presence of unreacted monomer.

Moreover, a specific selectivity between the capsule contents and the capsule wall forming material is required, and the capsule contents are affected by the capsule wall forming material. Thus, the kind of material which can be encapuslated is limited.

In the in situ polymerization method, the capsule wall forming material is fed only from one side of the interface, i.e., either from the inside or from outside the core material droplet, and thus the polymerization proceeds necessarily at the surface of the core material droplet. Almost all known polymerization methods can be employed and a variety of types of capsule walls can be formed.

The former method in which an oily monomer is present in the core material, is described in Japanese Pat. Publication No. 9168/1961, British Pat. No. 1,237,498, French Pat. Nos. 2,060,818, and 2,090,862. The latter method in which the capsule wall forming material is fed from the side of the medium and a polymer membrane is formed on the surface of the core material droplet, is described in British Pat. No. 989,264 and Japanese Pat. Publication Nos. 14327/1962, 12380/1962, 7313/1971, 29483/1970 and 30282/1971.

The capsule wall as prepared by these methods, with a few exceptions, also suffers from a wall formation which is still insufficient and the wall is still too porous.

Furthermore, problems often arise in that a specific selectivity between the capsule contents and the capsule wall forming material is required, the capsule contents are adversely affected by the capsule wall forming material, and some difficulty is encountered in encapsulation.

The encapsulation method employing a physical-chemical method includes a phase-separation from an aqueous solution, a drying in a liquid, and the like. The phase-separation from an aqueous solution comprises separating a phase rich in a polymer from an aqueous solution of the polymer, and it has been most widely commercialized and the greatest number of attempts toward utilization of this method have been made.

As methods, there are a complex coacervation method and a simple coacervation method, e.g., in which gelatin is used as a hydrophilic polymer.

The complex coacervation method is described in U.S. Pat. Nos. 2,800,457, 3,116,206, 3,265,630, 3,190,836, and 3,041,289. The methods of curing the above formed capsule wall are described in Japanese Pat. Publication Nos. 3878/1962, 3876/1962, 3877/1962, 12376/1962 and 24782/1964, and U.S. Pat. No. 3,401,123. As an agent for curing the capsule wall, formaldehyde, glyoxal, glutaraldehyde, and the like are often used.

Since the capsule wall prepared by the above methods is formed from a water soluble polymer, the capsule wall inherently has low resistance to water or humidity and thus swells and the capsule contents exude. Moreover, since the capsule wall formed is porous, low molecular substances tend to pass therethrough. The capsule contents are easily extracted with alcohols, esters and ketones.

Methods employing the simple coacervation method are described in U.S. Pat. No. 2,800,458, French Pat. No. 1,304,891, Japanese Pat. Publication Nos. 7727/1962, 7731/1962 and 9681/1962.

The capsule wall as prepared by the above simple coacervation methods has similar properties to those as prepared by the complex coacervation method.

In the method of drying in liquid, a solution of a capsule wall forming material containing a core material is dispersed in an encapsulation medium of water or oil and a solvent is evaporated to form a hard capsule wall.

This method is described in Japanese Pat. Publication Nos. 13703/1967, 28744/1964 and 28745/1964.

The capsule wall as formed by this method is generally a thin semipermeable membrane. Thus, where the core material is of low molecular weight, disadvantageously the core material passes through the capsule wall.

In addition to the above described encapsulation methods, a phase-separation from an organic phase method (see, for example, Japanese Pat. Publication No. 12379/1962 and U.S. Pat. No. 3,173,878) and a liquid drying method (see, for example, Japanese Pat. Publication Nos. 28744/1964, 28755/1964 and 13703/1967) are known. However, these methods do not provide walls of a sufficient thickness and the formed capsule wall is not sufficiently thin.

SUMMARY OF THE INVENTION

Accordingly, it is an object of the present invention to overcome the above described drawbacks.

It is also an object of the present invention to provide a simple process for producing microcapsules.

It is another object of the present invention to provide a process for producing microcapsules which are excellent in protecting the capsule contents and whose walls swell to a very low extent due to water or moisture.

It is a further object of the present invention to provide a process for producing microcapsules, which can be used to encapsulate a variety of materials.

It has been found that microcapsules can be extremely effectively produced by bonding a heterocyclic diamine, which is soluble or dispersible in water, to an organic compound in a polar solvent, the organic compound being capable of bonding chemically or physically (for example, electrostatically) to the heterocyclic amine to thereby form a substance insoluble in the polar solvent, and depositing the substance insoluble in the polar solvent directly on the surface of particles or droplets of a hydrophobic core material to encapsulate the hydrophobic core material.

DETAILED DESCRIPTION OF THE INVENTION

This simple process for producing microcapsules is not known, and the following advantages are unexpectedly obtained in accordance with the process of the present invention.

1. The microcapsules as produced by the above process have an excellent ability to protect the capsule contents and the walls of the capsules swell to only a small extent due to water or moisture.

2. Since the capsule contents are surrounded externally, the capsule wall forming materials are not limited by the kind of capsule contents. In addition, the capsule wall forming material does not adversely affect the capsule contents.

3. The process is simple and can be carried out in a system containing solids in a high concentration.

4. "Mononuclear capsules" in which capsules are separated from each other, or "multinuclear capsules" in which several or several tens of capsules adhere to each other or the adhered capsules are further surrounded by a capsule wall, can be optionally produced.

The heterocyclic diamines as used herein include not only the diamines but also their derivatives.

Preferred examples of heterocyclic diamines which can be suitably used are symmetrical or nonsymmetrical spiroacetal based heterocyclic diamines and more preferred examples are those compounds represented by the following formula and their derivatives.

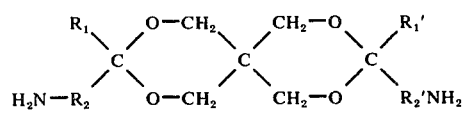

wherein R and R'$_1$ represent a hydrogen atom or a lower alkyl group (e.g., having 1 to 4 carbon atoms such as methyl, ethyl, propyl, and the like); R$_2$ and R'$_2$ represent a straight or branched chain alkylene group containing 1 to 7 carbon atoms (e.g., such as methylene, ethylene, 1,2-propylene, 1,3-propylene, 1,3-butylene, 1,5-pentylene, 1,6-heptylene, and the like).

Representative examples of heterocyclic diamine derivatives include condensates prepared by reacting an amino group of the amines of the above formula with compounds containing at least one oxirane group in the molecule including also alkylene oxides such as ethylene oxide, propylene oxide and the like; addition products prepared by reacting the compounds of the above formula with acrylonitrile; reaction products of the compounds of the above formula and urea, thiourea or guanidine; and the like.

Examples of spiroacetal based diamines represented by the above formula include 3,9-bis(2-aminoethyl)-2,4,8,10-tetraoxaspiro[5.5]undecane, 3,9-bis-(2-aminoethyl)-2,4,8,10-tetraoxaspiro[5.5]undecane, 3,9-diethyl-3,9-bis(2-aminoethyl)-2,4,8,10-tetraoxaspiro[5.5]undecane, 3,9-bis(3-aminopropyl)-2,4,8,10-tetraoxaspiro[5.5]undecane, 3,9-bis(4-aminopropyl)-2,4,8,10-tetraoxaspiro[5.5]undecane, 3,9-bis(5-aminopentyl)-2,4,8,10-tetraoxaspiro[5.5]undecane, 3,9-bis(1,1-dimethyl-4-aminobutyl)-2,4,8,10-tetraoxaspiro[5.5]undecane, 3,9-bis(5-aminopentyl)-2,4,8,10-tetraoxaspiro[5.5]undecane, 3,9-bis(6-aminohexyl)-2,4,8,10-tetraoxaspiro[5.5]undecane, 3,9-bis(7-aminoheptyl)-2,4,8,10-tetraoxaspiro[5.5]undecane and the like.

These compounds can be readily prepared by the methods as described in German Pat. No. 1,092,029 and U.S. Pat. No. 2,996,517.

The oxirane group containing compounds which can be used for forming the derivatives described above are alkylglycidyl ethers such as propylglycidyl ether, butylglycidyl ether, allylglycidyl ether and the like; condensates of epichlorohydrin and bisphenols (for example, Epikote 562, Epikote 812, Epikote 815, Epikote 820, Epikote 828 and Epikote 834, trade names, supplied by Shell International Chemical Co.); phenol based epoxides prepared by the reaction of initial condensates of phenol resins with epichlorohydrin; polyglycol based epoxides prepared by reaction of ethylene glycol, propylene glycol or polyglycols thereof with epichlorohydrin; glycidyl esters prepared by replacing the hydrogen of the carboxyl group with a glycidyl group (for example, "Carjura E", supplied by Shell International Chemical Co.); alkylene oxides such as ethylene oxide, propylene oxide and octylene oxide; epoxidized polybutadiene; epoxidized vegetable oil aliphatic acids prepared by epoxidation of glycerides of unsaturated aliphatic acids with peracetic acid; epoxidized glycerides; and the like.

The condensation products of the oxirane group containing compounds and the spiroacetal based diamines can be prepared by heating the materials to temperatures higher than the melting point of the spiroacetal based diamine in the presence or absence of a solvent. Preferred condensates are those which are prepared in which one or more amino groups per oxirane group are present (for example as described in Example 1 of Japanese Pat. Publication No. 26097/1967).

The addition products of spiroacetal based diamines and acrylonitrile can be easily prepared by mixing them and heating the mixture to temperatures higher than the melting point of the spiroacetal based diamine or near to the boiling point of acrylonitrile (see, for example, the procedure as described in Example 1 of Japanese Pat. Publication No. 2586/1969).

The reaction products of the spiroacetal based diamines and urea, thiourea or guanidine can be easily prepared by conventional methods, for example, as disclosed in *Dai-Yuki Kagaku* (*Organic Chemistry*), 23, 213, Asakura Shoten, (1968).

Encapsulation method of the present invention comprises adding the above heterocyclic diamines (including their derivatives) to a polar solvent, such as water, ethylene glycol, glycerin, etc. in which hydrophobic liquid droplets or solid particles are dispersed in an amount of about 0.01 equivalents to an equivalent amount, preferably 0.02 to 0.2 equivalents, by weight to the weight of the dispersed contents, bonding the heterocyclic diamines to reactive organic compounds such as aldehydes such as acetaldehyde, formaldehyde, glyoxal, methylglyoxal, glutaraldehyde, acrolein, 2-hydroxyacetaldehyde, dialdehyde starch, etc., epoxy compounds such as the reaction product of water-soluble polyol-2-epichlorohydrin which is soluble or dispersible in water, e.g., diglycidyl ether of polyethylene glycol, diglycidyl ether of glycerin, triglycidyl ether of trimethylolpropane, diglycidyl ether of propylene glycol, etc., alkyl halides, acid anhydrides, acyl halides, polyhalohydrins, polybasic acid chlorides and the like (used alone or in admixtures comprising two or more thereof) which are present in the polar solvent to form compounds which are insoluble in the polar solvent and depositing the compounds directly on the surface of the hydrophobic liquid droplets or solid particles. The droplet or particle size can vary widely depending on the end use purpose and in the encapsulation accomplished, all procedures are performed with agitation.

The heterocyclic diamines preferably are added after the addition of the organic compound to be bonded to the amine, but they can be added at the same time or prior to the addition of the organic compounds.

The capsule wall forming compound is preferably added at low temperatures, e.g., about 5° to 25° C, and more preferably at temperatures below 20° C, e.g., about 15° to 20° C. After the addition, the system preferably is heated to a temperature higher than about 15° C, e.g., about 15° C to about 100° C at an pH ranging from about 3 to 13 more preferably an alkaline pH and, more preferably, to a temperature higher than about 40° C.

The above described reactive organic compound is added in an amount sufficient to bond to the heterocyclic amine to thereby form a substance insoluble in the polar solvent. The amount of the reactive organic compound is preferably about 1/30 to 30 times by weight of that of the diamine and, more preferably, about 1/10 to 5 times by weight.

It is, however, to be noted that the amount added is not limited only to the above described range because the capsule wall becomes thicker by increasing the amount and thus the amount can be determined depending upon the desired properties.

In addition to the heterocyclic diamines, water-soluble or water-dispersible low molecular weight amines containing at least one amino group such as monoamines containing up to about 20 carbon atoms, e.g., about 1 to 20 carbon atoms, preferably 8 to 18 carbon atoms, such as octylamine, nonylamine, dodecylamine, stearylamine and the like; diamines such as ethylenediamine, trimethylenediamine, 1,7-diaminoheptane, 1,9-diaminononane, 1,10-diaminodecane, N,N-diaminopropyl piperazine and the like; triamines such as diethylenetriamine, m-hexamethylenetriamine, tris(N-aminopropyl)isocyanate, guanidine and the like; tetramines such as triethylenetetramine and the like; pentamines such as tetraethylenepentamine and the like; hexamines such as trimethylolmelamine; and mineral acid salts such as bisulfite or bisulfinic acid salts, hydrochloric acid salts, and the like thereof, can be added in an amount of not more than about 70%, preferably not more than 30% (by weight), based on the weight of the heterocyclic diamine, and then a thinner capsule wall can be obtained.

On using a water-soluble or water-dispersible resin containing an amino-type functional group such as urea resins (including those which are modified by cationic modifying agents such as guanidine, diamine diamide, guanyl urea, dicyandiamide formate, a polyalkylene polyamine, hydroxylamine and the like; and those which are modified by anionic modifying agents such as bisulfite salts, sulfanic acid, sulfanyl acid, lignosulfonic acid and the like), melamine resins, urea-melamine condensation resins, polyamide resins, polyacrylamide resins, polyethyleneimine, urethanated polyvinyl alcohol, polyamide-polyamine-epichlorohydrin resins, triazone resins, alkylene ureas, epoxy polyureapolyamide polycondensation resins, even stronger capsule wall can be obtained. These compounds can be added at any stage during the encapsulation procedure and in any amount, preferably in an amount of 1/10 to 20 times by weight (on a solids basis) of the heterocyclic diamine.

The heterocyclic diamines as well as the derivatives thereof of the present invention are soluble or dispersible in water and become turbid in the alkali range. Moreover, they are easily reactive with the reactive organic compound in the polar solvent, and they are extremely stable and do not color during storage.

It is more preferred that after the addition of the heterocyclic diamines, reactive organic compounds and, if desired, other additives as described above, to add alkalis such as sodium hydroxide, potassium hydroxide, sodium carbonate and the like to make the pH of the system more alkaline and the temperature of the system is increased to higher than about 15° C, e.g., about 15° C up to about 100° C.

The following examples and preparation examples are given to illustrate the invention in greater detail. Unless otherwise indicated, all parts, percents, ratios and the like are by weight.

PREPARATION EXAMPLE 1

To 18.5 g (0.1 mol) of cyanopentanal dimethylacetal were added 6.8 g (0.05 mol) of pentaerythritol, 1 g of p-toluene sulfonic acid and 100 ml of toluene, and the resulting mixture was heated under refluxing for 4 hours. The reaction mixture was filtered, and the filtrate was condensed under reduced pressure to obtain 17.5 g of a syrup-like product of 3,9-bis-(4-cyanobutyl)-2,4,8,10-tetraoxaspior[5.5]undecane.

The syrup-like product was dissolved in 60 ml of ethanol and charged into an autoclave together with 100 ml of ethanol saturated with ammonia and 5 g of a rolled or extended Raney cobalt catalyst. Hydrogen was introduced at an initial hydrogen pressure of 170 Kg/cm$^2$ and at a temperature of 120° C for 2 hours. After removing the catalyst, the resulting filtrate was condensed and the concentrate was distilled in vacuum to obtain 8.2 g of 3,9-bis(5-aminopentyl)-2,4,8,10-tetraoxaspiro[5.5]undecane as a 217° to 221° C/0.2 mm Hg fraction.

To 33.1 parts by weight of 3,9-bis(5-aminopentyl)-2,4,8,10-tetraoxaspiro[5.5]undecane as obtained above which was melted and maintained at 60° C, was added dropwise 13.0 parts by weight of butyl glycidyl ether while stirring over a period of 1.5 hours. After the addition, the stirring was continued for an additional 2 hours. The thus-obtained reaction condensate was a colorless, transparent and viscous liquid.

PREPARATION EXAMPLE 2

The condensation reaction of 11.9 g of 7-cyanoheptanal dimethylacetal and 4.35 g of pentaerythritol was carried out to obtain 13.6 g of 3,9-bis(6-cyanohexyl)-2,4,8,10-tetraoxaspiro[5.5]undecane, which was then subjected to catalytic reduction to form 8.6 g of 3,9-bis(7-aminoheptyl)-2,4,8,10-tetraoxaspiro[5.5]undecane.

To 386 parts by weight of 3,9-bis(7-aminoheptyl)-2,4,8,10-tetraoxaspiro[5.5]undecane as obtained, which was melted at a temperature of 80° to 85° C, was added dropwise 130 parts by weight of butyl glycidyl ether with stirring over a period of 1.5 hours. After the addition, the stirring was continued for an additional 2 hours.

PREPARATION EXAMPLE 3

In a reaction vessel equipped with a stirrer, a reflux condenser, a dropping funnel and a thermometer, 109.6 g (0.4 mol) of 3.9 bis(3-aminopropyl)-2,4,8,10-tetraoxaspiro[5.5]undecane (hereinafter referred to as ATU) was melted maintaining the inner temperature at 45° to 55° C, to which 30.0 g (0.2 mol) of phenyl glycidyl ether was dropped over a period of 2 hours. After the addition, the stirring was continued for an additional 2 hours. The product so prepared was colorless, transparent and viscous liquid.

PREPARATION EXAMPLE 4

The procedure of Preparation Example 3 was repeated using 27.4 g (0.1 mol) of ATU and 11.4 g (0.1 mol) of allyl glycidyl ether.

PREPARATION EXAMPLE 5

The procedure of Preparation Example 3 was repeated using 27.4 g (0.1 mol) of ATU and 6.5 g (0.05 mol) of butyl glycidyl ether.

PREPARATION EXAMPLE 6

The procedure of Preparation Example 3 was repeated using 27.4 g (0.1 mol) of ATU and 9.3 g (0.05 mol) of Carjura E (trade name for a glycidyl ester sold by Shell International Chemical Co.).

PREPARATION EXAMPLE 7

To 274 g (1 mol) of 3,9-bis(3-aminopropyl)-2,4,8,10-tetraoxaspiro[5.5]undecane, which was melted by maintaining at a temperature of 45° to 55° C, was added dropwise 53 g (1 mol) of acrylonitrile with stirring over a period of one hour. After the addition, the stirring was continued at a temperature of 60° C for an additional one hour. A colorless, transparent and viscous liquid was quantitatively obtained.

EXAMPLE 1

One part of PVA-210 (a trade name of a polyvinyl alcohol supplied by Kuraray Co.; degree of saponification: 87%; average degree of polymerization: 1,000) and 1 part of carboxymethyl cellulose (molecular weight: about 35,000; degree of etherification: about 0.7) were dissolved in 20 parts of water by heating and cooled to room temperature (about 20° to 30° C) to form a colloid solution.

To the colloid solution was added 15 parts of diisopropyl naphthalene oil in which 2.5% by weight of Crystal Violet lactone and 2.0% by weight of benzoyl and leuco Methylene Blue were dissolved, with stirring to prepare an o/w emulsion. When the diameter of the oil droplet was about 8 to 12 $\mu$, the stirring was stopped.

The o/w emulsion was diluted with 70 parts of water at 15° C and dispersed therein, and the emulsion was maintained at 10° C by external cooling.

To the emulsion were added 0.3 parts of 50% glutaraldehyde and 0.3 parts of 37% formaldehyde. Then, 1.0 part of the compound as prepared in Preparation Example 1 was diluted with 5 parts of water and dropped into the emulsion, and the mixture was heated to 50° C by external heating and maintained at this temperature for one hour to prepare a color former containing capsule.

The capsule so prepared was subjected to heat resistance testing at 100° C and 10 hours, but no release of the capsule contents was observed. Thus, it was found that the capsule had an excellent ability for protection. Moreover, it was usable for a pressure sensitive paper.

For instance, 5 parts of a 10% solution of PVA-105 (trade name of polyvinyl alcohol supplied by Kuraray Co.; degree of saponification: 93%; degree of polymerization: 1,000), and 0.5 parts of corn starch were added to 10 parts of the above capsule slurry and coated on a paper of 50 g/cm² in an amount of 5.5 g/m² to form a capsule coated paper.

The paper as coated above was placed on an underlying paper of a commercially available pressure sensitive copying paper (containing clay and a phenol resin as a color developer) and writing pressure was applied. A copied image of a sharp blue color was obtained.

EXAMPLE 2

Four parts of gum arabic was dissolved in 20 parts of water. Then, 0.2 parts of sodium nonylbenzene sulfonate was added to the solution as an emulsifier to prepare a colloid solution.

To the colloid solution, 40 parts of a color former oil of the following composition was added to prepare an o/w emulsion having a stirred emulsion droplet size of 10 to 12 μ in diameter. The emulsion was diluted with 100 parts of water at 15° C and dispersed therein, and then the mixture was cooled to 8° C.

| Color Former Oil Composition | Parts |
| --- | --- |
| Crystal Violet Lactone | 0.25 |
| 3-Methyl-2,2-spirobi(benzo[f]-chromene) | 0.5 |
| 7-N,N-Diethylamino-3-(N,N-diethylamino)fluorane | 7.5 |
| Rhodamine-B-(p-nitroanilino)-lactam | 0.5 |
| 7-Diethylamino-2,3-dimethyl fluorane | 2.5 |
| Benzoyl Leuco Methylene Blue | 20 |
| Monoisopropylbiphenyl | 70 |
| Kerosene | 16 |

To the above emulsion, 0.5 parts of 37% formaldehyde and 0.5 parts of 25% glyoxal were added, and then 10 parts of a 20% aqueous solution of the compound as obtained in Preparation Example 2 was added. After the addition was complete, 0.5 parts of 20% sodium hydroxide was added to make the system alkaline.

The system was heated and maintained at a temperature of 60° C for 2 hours. Thus, a color former oil containing capsule was obtained.

The thus-obtained capsule was usable for a pressure sensitive copying paper. To 100 parts of the capsule liquid were added 15 parts of an aqueous solution of 20% acetylated starch, 3 parts of wheat starch having an average diameter of 18 μ, and 2 parts of Cellulose KC-W-200 (trade name: supplied by Kokuraku Pulp Co., Ltd., for cellulose floc), which was coated on a paper of 50 g/m² in an amount of 5.5 g/m² and then dried.

The coated paper was placed on an underlying paper of a commercially available pressure sensitive paper and was written upon. A clear black color image was obtained.

EXAMPLE 3

In 30 parts of diphenyl methane based oil

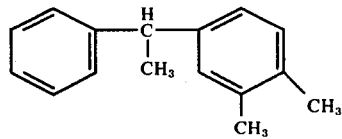

were dissolved 2.0 parts of 2.5% by weight of Crystal Violet lactone and 0.5% by weight of Rhodamine B-anilino lactam to prepare a color former oil for a pressure sensitive paper. 2 parts of PVA-205 (trade name of polyvinyl alcohol supplied by Kuraray Co.; degree of saponification: 87%; average degree of polymerization: 500) and 2 parts of Scripset-500 (trade name: the sodium salt of a 50:50 molar ratio copolymer of styrene and maleic anhydride supplied by Monsanto Co.) were dissolved in 30 parts of water to prepare a colloid solution.

The color former oil was added to the colloid solution with stirring to prepare an o/w emulsion of 10 to 12 μ in diameter.

The emulsion was dispersed in 150 parts of water and cooled to 8° C. To the system was added a solution of one part of 3,9-bis(3-aminopropyl)-2,4,8,10-tetraoxaspiro[5.5]undecane, 3 parts of the compound as prepared in Preparation Example 3, and 10 parts of water. In addition, 2 parts of 20% formaldehyde and 0.5 parts of 25% methylglyoxal were added (with the formaldehyde being added slowly).

2 parts of 10% sodium carbonate was added and the temperature of the system was increased to 60° C to facilitate the reaction. This temperature was maintained for 30 minutes and then a color former oil containing capsule liquid suitable for a pressure sensitive copying paper having a stong capsule wall was obtained.

To the thus-obtained capsule liquid were added 10 parts of arrowroot starch, 1 part of talc and 50 parts of 10% oxidized starch, which was then coated on a paper of 40 g/m² in an amount of 5.0 g/m² and dried.

The thus-obtained coated paper was allowed to stand in a drier at 100° for 10 hours, and it was placed under an underlying paper of a pressure sensitive paper and writing pressure was applied thereto. A copied image of a sharp blue color was obtained. The color density was the same as that prior to the heat resistance test in a drier, which shows that the capsule obtained by the present invention is excellent in durability (protection ability).

EXAMPLE 4

The following ingredients were mixed to prepare a color former oil

| | Parts |
| --- | --- |
| Santhotherm 66 (trade name, hydrogenated terphenyl supplied by Mitsubishi Monsanto Co.) | 30 |
| Crystal Violet Lactone | 1.5 |
| 3-Methyl-2,2-spiro(benzo[f]chromene) | 0.5 |
| Benzoylleuco Methylene Blue | 1.0 |
| Kerosene | 5 |

The above color former oil was emulsified with stirring in a solution prepared by dissolving 3 parts of polyvinyl alcohol PVA-210 in 30 parts of water to prepare an o/w emulsion having a particle diamter of 10 to 12 μ. The emulsion was mixed with 150 parts of water and cooled to 8° C.

To the system was added 20 parts of U-Ramin P-5200 (trade name: cation type epoxy-polyurea-polyamide co-condensation resin supplied by Mitsui Toatsu Co., resin concentration: 25%; specific gravity: 1.08 (20° C); viscosity: 0.25 – 0.45 poise (20° C); pH: 5.0). In addition, 0.5 parts of 50% glutaraldehyde, 0.5 parts of 25% glyoxal and 0.5 parts of 37% formaldehyde were added. Then, 3 parts of the compound as obtained in Preparation Example 4 was added, and then 5 parts of 20% hexamethylene diamine was added.

The temperature of the liquid was increased to 70° C while stirring by external heating and the solution was maintained at this temperature for 1 hour to carry out encapsulation.

The thus-obtained capsule was excellent in heat resistance and was unsable for a pressure sensitive copying paper.

EXAMPLE 5

In an aqueous solution of 5 parts of polyvinyl alcohol (average degree of polymerization: 1,000; degree of saponification: 97%), 5 parts of sodium carboxymethyl cellulose (molecular weight: about 35,000; degree of etherification: about 0.7), and 45 parts of water was emulsified 25 parts of dibutyl maleate to form an o/w emulsion having an particle diameter of 15 to 20 μ.

The emulsion was poured in 125 parts of water at 20° C. Then, 15 parts of U-Ramin XP-72 (trade name: nonionic type urethanated PVA supplied by Mitsui Toatsu Co., resin concentration: 25%; specific gravity: 1.1 (20° C); viscosity: 1.4 poise (30° C); pH: 8.0) was added and cooled to 15° C. After the addition of 1.0 part of 37% formaldehyde and 10 parts of 5% dialdehyde starch were completed, 1.5 parts of the compound as prepared in Preparation Example 5 and 5 parts of 50% tetraethylene pentamine were added.

Then, 0.5 parts of an epoxy compound having the formula

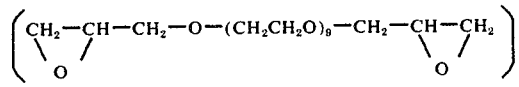

was added, and the temperature of the system was increased to 60° C and the system was maintained at this temperature for 5 hours.

The thus-obtained capsule liquid was applied to spray dryer to obtain dibutyl maleate containing capsules.

EXAMPLE 6

A perfume oil of 10 parts of orange perfume and 15 parts of trioctyltrimate was prepared.

The perfume oil was emulsified in an aqueous solution of 2 parts of carboxy methyl cellulose sodium salt (molecular weight: about 35,000; degree of etherification; about 0.7), 3 parts of gum arabic, and 30 parts of water to prepare an o/w emulsion having a particle diameter of 20 to 30 μ. To the emulsion, 100 parts of hot water at 20° C was added with stirring, and then 20 parts of U-Ramin P-1800 (trade name: cationic type specifically modified urea resin supplied by Mitsui Toatsu Co., resin concentration: 25%; specific gravity: 1.11 (20° C); viscosity; 1.5 – 2.5 poise (20° C); pH: 7.5), 2 parts of the compound as obtained in Preparation Example 6, 10 parts of 10% guanidine sulfate, and 2 parts of 37% formaldehyde were added. Then, 20% potassium hydroxide was added to adjust the pH of the system to 11.

The temperature of the system was gradually increased to 60° C by external heating while slowly stirring and the system was maintained at this temperature for 24 hours.

To the thus-obtained orange perfume capsule liquid were added 30 parts of 20% aqueous solution of polyvinyl alcohol (degree of saponification: 87%; degree of polymerization: 1,000) and 7 parts of corn starch to prepare a perfume ink.

The ink was printed on a paper support by using a silk screen method.

On scratching the printed portion with a finger, an orange odor was observed.

After the printing was placed on wall for one week, the capsule was broken by applying pressure thereto and then an orange odor was observed. Thus, it was recognized that the capsule was excellent in protection of a perfume.

EXAMPLE 7

Epikote 834 (trade name: epoxy resin supplied by Shell Chemical Co., epoxy equivalent: about 240; average molecular weight: about 450) was emulsified in an aqueous solution of 1 part of polyvinyl alcohol, 3 parts of carboxy methyl cellulose (molecular weight: about 35,000; degree of etherification: about 0.7) and 25 parts of water to prepare an o/w emulsion having a particle diameter of 30 to 40 μ. 100 parts of water at 6° C was added to the emulsion, and then 2 parts of diethyl aminopropyl amine, 2 parts of the compound as prepared in Preparation Example 7, and 1 part of 37% formaldehyde were added. Then, 10% sodium hydroxide was added to adjust the pH of the system to 10.0.

In addition, 15 parts of Sumitex Resin A-1 (trade name: Polyacrylamide resin supplied by Sumitomo Chemical Co., viscosity: 84 poise at 25° C, 11% solution) was added and the temperature of the system was increased to 50° C.

This temperature was maintained for one hour to prepare an epoxy resin containing capsule. The capsule can be utilized as an epoxy component for two liquid type epoxy resin adhesive.

EXAMPLE 8

In 30 parts of dioctyl phthalate was dispersed 20 parts of needle-like γ-Fe₂O₃ having a size of (0.3 to 0.4 μ) × (0.01 to 0.02 μ).

The dispersion was added to an aqueous solution of 3 parts of Gantrez 119 (trade name: polyvinyl methyl ether-maleic anhydride copolymer supplied by General Aniline Co., ηsp 0.3) and 30 parts of water to prepare an o/w emulsion. When the diameter of the emulsion droplet was 10 to 15 μ, supersonic dispersion was carried out to adjust the droplet diameter to 1 to 2 μ. After the system was cooled to 10° C, 20 parts of Kymene 557 (trade name; polyamide polyamine epichlorohydrin resin supplied by Hercules Co., viscosity: A – B⁺ (Gardner-Holdt scale); pH: 5.0 ± 0.3; freezing point −4° C) was added. Then, 0.5 parts of 50% glutaraldehyde and 1.0 part of 37% formaldehyde were added. After adding a 50% solution of the compound as prepared in Preparation Example 1 in water, the temperature of the liquid was increased to 50° C and the system was maintained at this temperature for 2 hours. Thus, magnetic compound containing capsules were obtained.

While the invention has been described in detail and with reference to specific embodiments thereof, it will be apparent to one skilled in the art that various changes and modifications can be made therein without departing from the spirit and scope thereof.

What is claimed is:
1. A process for producing externally surrounded microcapsules which comprises bonding
   a. a water-soluble or dispersible spiroacetal based heterocyclic diamine represented by the formula:

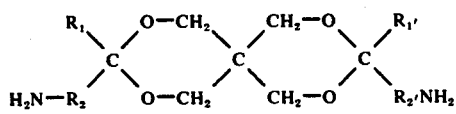

wherein $R_1$ and $R_1'$ each represent a hydrogen atom or a lower alkyl group, and $R_2$ and $R_2'$ each represent a straight or branched chain alkylene group containing 1 to 7 carbon atoms; or an addition product thereof selected from the group consisting of a reaction product of the said heterocyclic diamine with a compound containing at least one oxirane group in the molecule, acrylonitrile, urea, thiourea, or guanidine; to
   b. an organic compound selected from the group consisting of an aldehyde, an epoxy compound, an alkyl halide, an acid anhydride, a polyhalohydrin and a polybasic acid chloride: the proportion of component (b) to (a) being from about 1/30 to 30 times by weight, in a polar solvent containing dispersed particles or droplets of a hydrophobic material to form a compound which is insoluble in said polar solvent and depositing said insoluble compound from said polar solvent directly on the surface of said particles or droplets of a hydrophobic material to encapsulate said hydrophobic material.

2. The process according to claim 1, wherein said polar solvent includes a water-soluble or dispersible monoamine or polyfunctional amine in an amount up to about 70% by weight to the weight of said heterocyclic diamine.

3. The process according to claim 1, wherein said polar solvent contains a water-soluble or dispersible amino type functional group containing resin in an amount up to about 20 times by weight on a solids basis the weight of said heterocyclic diamine.

4. The process according to claim 1, wherein the weight ratio of the organic compound to the heterocyclic diamine is about 1/10 to 5:1.

5. The process according to claim 1, wherein the polar solvent is water.

6. The process according claim 1, wherein said bonding of the heterocyclic diamine and the organic compound comprises mixing heterocyclic diamine and the organic compound at a temperature of at below 25° C and heating the mixture to higher than 15° C in an alkaline pH range with the heating temperature being higher than the mixing temperature.

7. The process according to claim 1, wherein the heterocyclic diamine is selected from the group consisting of 3,9-bis(2-aminoethyl)-2,4,8,10-tetraoxaspiro[5.5]undecane, 3,9-bis(aminoethyl)-2,4,8,10-tetraoxaspiro[5.5]undecane, 3,9-diethyl-3,9-bis(2-aminoethyl)-2,4,8,10-tetraoxaspiro[5.5]undecane, 3,9-bis(3-aminopropyl)-2,4,8,10-tetraoxaspiro[5.5]undecane, 3,9-bis(4-aminopropyl)-2,4,8,10-tetraoxaspiro[5.-5]undecane, 3,9-bis(5-aminopentyl)-2,4,8,10-tetraoxaspiro[5.5]undecane, 3,9-bis(1,1-dimethyl-4-aminobutyl)-2,4,8,10-tetraoxaspiro[5.5]undecane, 3,9-bis(5-aminopentyl)-2,4,8,10-tetraoxaspiro[5.5]undecane, 3,9-bis(6-aminohexyl)-2,4,8,10-tetraoxaspiro[5.5]undecane, and 3,9-bis(7-aminoheptyl)-2,4,8,10-tetraoxaspiro[5.5]undecane.

8. The process according to claim 1, wherein the oxirane group containing compound is selected from the group consisting of an alkylglycidyl ether, a condensate of epichlorohydrin and a bisphenol, a phenol based epoxide, a polyglycol based epoxide, a glycidyl ester, an alkylene oxide, an epoxidized vegetable oil aliphatic acid, and an epoxidized glyceride.

9. The process according to claim 1, wherein the compound containing at least one oxirane gorup is an alkylene oxide and is selected from the group consisting of ethylene oxide and propylene oxide.

10. The process of claim 1, wherein said spiroacetal based heterocyclic diamine is added to the polar solvent after the addition of said organic compound.

11. The process of claim 1, wherein said spiroacetal based heterocyclic diamine is added to the polar solvent before the addition of said organic compound.

12. The process of claim 1, wherein said spiroacetal based heterocyclic diamine is added at the same time of the addition of said organic compound.

13. The process of claim 1, wherein said hydrophobic material comprises particles.

14. A process for producing microcapsules which comprises mixing a water-soluble or dispersible heterocyclic diamine represented by the formula

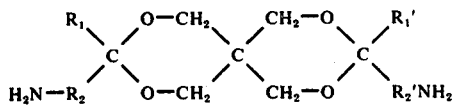

wherein $R_1$ and $R_1'$ each represents a hydrogen atom or a lower alkyl group, and $R_2$ and $R_2'$ each represents an alkylene group containing 1 to 7 carbon atoms, with an organic compound selected from the group consisting of an aldehyde, an epoxy compound, an alkyl halide, an acid anhydride, a polyhalohydrin and a polybasic acid chloride, wherein said organic compound is added in an amount of from about 1/30 to 30 times by weight of the diamine, capable of bonding to the heterocyclic diamine to form a water-insoluble compound in water containing particles or droplets of a hydrophobic material, dispersed in the water at temperatures below about 25° C, and heating said mixture at temperatures higher than about 15° C in alkaline pH range whereby said heterocyclic diamine bonds to said organic compound to form a water-insoluble compound and said water-insoluble compound is deposited from said water directly on the surface of said particles or droplets of the hydrophobic material to encapsulate the particles or droplets of the hydrophobic material.

* * * * *